United States Patent [19]

Kavanagh

[11] Patent Number: 5,584,449
[45] Date of Patent: Dec. 17, 1996

[54] GENERATION AND CONTROL OF INFLATABLE BALLOONS

[75] Inventor: Phillip R. Kavanagh, New South Wales, Australia

[73] Assignee: Kavanagh Balloons Pty Limited, New South Wales, Australia

[21] Appl. No.: 513,680

[22] Filed: Jul. 28, 1995

Related U.S. Application Data

[63] Continuation of Ser. No. 397,988, Mar. 3, 1995, abandoned.

[30] Foreign Application Priority Data

| Mar. 11, 1994 | [AU] | Australia | PM4397 |
| Mar. 15, 1994 | [AU] | Australia | PM4482 |
| Nov. 10, 1994 | [AU] | Australia | 77766/94 |

[51] Int. Cl.$^6$ ............... B64B 1/62; B64D 17/18; B64D 17/34
[52] U.S. Cl. .................. 244/99; 249/31; 249/96; 249/152
[58] Field of Search .................. 244/30, 31, 96, 244/97, 99, 145, 152

[56] References Cited

U.S. PATENT DOCUMENTS

| 2,404,659 | 7/1946 | Rohulick | 244/145 |
| 3,229,932 | 1/1966 | Yost | 244/31 |
| 3,558,083 | 1/1971 | Conley | 244/33 |
| 3,860,201 | 1/1975 | Hall | 244/99 |
| 4,033,527 | 7/1977 | Parsons | 244/99 |
| 4,402,476 | 9/1983 | Wiederkehr | 244/31 |
| 4,432,513 | 2/1984 | Yost | 244/31 |
| 4,651,956 | 3/1987 | Winker et al. | 244/99 |
| 4,836,471 | 6/1989 | Piccard | 244/99 |
| 5,149,015 | 9/1992 | Davis | 244/31 |
| 5,248,117 | 9/1993 | Hennings | 244/152 |

FOREIGN PATENT DOCUMENTS

| 2253683 | 10/1973 | France . | |
| 1819799 | 6/1993 | U.S.S.R. | 244/31 |
| 2260956 | 5/1993 | United Kingdom . | |

Primary Examiner—Andres Kashnikow
Assistant Examiner—Virnalissi Mojica
Attorney, Agent, or Firm—Galgano & Burke

[57] ABSTRACT

A thermal aircraft, such as a hot air load-carrying balloon which includes a balloon envelope having a deflation aperture therein and a venting valve or operculum designed to removably cover and seal the aperture and to be opened and/or closed rapidly so as to assist in the control of the balloon, forming both a deflation panel and a maneuvering port for the balloon. The venting valve is removably and releasably secured to the balloon envelope adjacent the periphery of the aperture, and means are provided for controllably and selectively positioning the valve in the aperture for open and closed dispositions thereof. Separate controls are provided firstly to extend the valve to its maximum surface area, at which point it removably covers and seals the aperture and/or to allow controlled venting of hot air therefrom, and secondly to allow reefing of the valve from the aperture for rapid deflation of the envelope. This provides the pilot with a great deal of control over the flight of the balloon, especially during final landing procedures and especially during such procedures in gusty or windy conditions, contributing significantly to control and safety.

23 Claims, 4 Drawing Sheets

GENERATION AND CONTROL OF INFLATABLE BALLOONS

This is a continuation of application Ser. No. 08/397,988 filed on Mar. 3, 1995, now abandoned.

BACKGROUND TO THE PRESENT INVENTION

1. Field of the Invention

This invention relates in general to the generation and control of thermal aircraft, and especially of hot air inflatable balloons. In particular, the invention relates to improved venting means for venting or deflation of thermal aircraft and to thermal aircraft incorporating such venting means.

2. Description of the Prior Art

Thermal aircraft, such as hot air balloons, comprise an aerostat or an envelope having a top opening with a top cap for closing the opening, and a gondola suspended from the bottom of the envelope. During normal flight, the top opening is closed, but can be partially opened during flight for venting of hot air from the envelope for vertical maneuvering. At the end of the flight the top opening is fully opened to rapidly deflate the envelope.

Deflation of the envelope is an important factor in the control of the balloon or other thermal aircraft. It is necessary and desirable when the balloon lands to rapidly deflate the balloon so that the envelope will rapidly collapse thus preventing the balloon from being blown across the ground by the wind, which has been the cause of many serious ballooning accidents. In the past, rapid deflation has usually been achieved by means of one or more removable panels attached to the envelope by means of hook and loop fasteners such as "Velcro" or similar fastening means, or by means of a "parachute valve" temporarily closing and being removable from an aperture at the upper end of the balloon envelope.

The invention of the parachute vent or parachute valve for conventional parachutes is generally attributed to Rohulick, U.S. Pat. No. 2,404,659 published in 1946. Rohulick conceived the idea of a parachute wherein the main parachute canopy or umbrella included a relatively small auxiliary umbrella to control the opening of an aperture at the top of the main parachute canopy. This concept was subsequently adapted to the control of hot air balloons by Robert Noirclerc (French Pat. No. 2 253 654—see below) in 1973, and by Tracy Barnes in 1974 (not patented). See also U.S. Pat. No. 4,033,527 to Roger Parsons, published in 1976, wherein the adaptation of a parachute valve to hot-air airships is disclosed.

A parachute vent is typically an oversize circular panel manufactured from the same material as that used in the balloon envelope (e.g. high tenacity polyurethane coated ripstop nylon), held in place against the underside of the aperture in the top of the balloon by internal (hot) air pressure. The seal is a suction seal of fabric of the parachute against the fabric of the balloon envelope surrounding the perimeter of the aperture. In effect, the parachute acts as an operculum, and the parachute and associated aperture operate or act as an opercular or operculate valve.

The parachute normally seals and is seated against the balloon aperture, being appropriately centered against the aperture and/or within the balloon envelope by means of a plurality of centralising lines extending between the outer perimeter of the parachute and the inner walls of the envelope. A plurality of shroud lines depend downwardly from the perimeter of the parachute, joined together at a point centrally below the parachute, fitted with a pulley. A parachute activation cord passes through this pulley, tethered at one end to the inner wall or a seamed rib of the envelope towards the lower end thereof, with the other end of the activation cord extending to the operator, or balloon pilot, in the basket below the balloon envelope. In operation, if the pilot wishes to descend or to simply vent the balloon, the pilot pulls the activation cord downwardly, which pulls the parachute downwardly and away from the aperture, venting the balloon envelope to the atmosphere. As the pilot releases the downward pull pressure on the activation cord, the parachute is forced upwards by the internal pressure within the balloon such that the parachute seats against and seals the upper aperture of the balloon.

As the size of the hot air balloons have increased during recent years, the operation of parachute vents have become a problem for all but very heavy pilots. This problem is exacerbated during the balloon landing phase, since the force required to activate or to open the vent is increased during the landing phase, due to pressure from the escaping air which tends to force the parachute operculum vent back up against the aperture.

During the past two decades, numerous attempts have been made to improve the reliability of parachute-type vents or to improve the mechanical advantage in operating same. French Pat. No. 2 253 654 (Noirclerc), published in July 1975 and based on an application filed in France in December 1973, discloses a parachute vent for aerostats—including hot air balloons—wherein the vent is a double vent arrangement comprising a small inner parachute vent coaxially and concentrically aligned within a larger outer parachute vent, which in turn controls the closure of an aperture at the upper end of the envelope of a hot air balloon. The small vent is opened first, followed by the opening of the larger vent for precise and rapid deflation of the envelope.

U.S. Pat. No. 4,651,956 to James Winker et al, granted March 1987, discloses a hot air balloon having a top cap or closure valve which forms both a deflation panel and a maneuvering port for the balloon. The top cap is releasably secured to the balloon envelope by means of a closure assembly including a fixed member secured to the envelope interior and a releasable member which is firstly secured to the top cap and secondly releasably secured to the fixed member. However, once released it is not possible to re-set the top cap in flight, or to terminate or reverse the deflation process once it has been commenced.

U.S. Pat. No. 4,836,471 to Donald Piccard, granted June 1989, discloses a parachute-type vent for hot air balloons which may be opened by applying force to a pull cord having a series of pulleys whereby the applied force is provided with an improved mechanical advantage. In one embodiment, the closure valve is provided with a reefing line to choke the closure valve radially inwardly to open the balloon aperture for rapid deflation of the balloon. However, again it is not possible to reset the valve in flight or to reverse or terminate the deflation process once it has been commenced.

British patent publication No. GB 2260956A in the name of Cameron Balloons Limited (inventor Donald A. Cameron), published in May 1993, discloses a venting valve for a hot air balloon having a valve member which may be secured to the envelope by a releasable locking mechanism to limit the valve-opening movement of the valve member. In this venting valve, with the valve member secured to the envelope by the locking mechanism, the valve member is prevented from moving clear of the balloon aperture. This is suitable for in-flight venting of the balloon envelope since the valve can be readily opened and closed in flight. For rapid deflation of the balloon envelope, the locking mechanism is released and the valve member moves to a position well clear of the balloon aperture allowing increased outflow of air. However, when the locking mechanism has been released, it is not possible to reset the valve member in place during flight.

Also within the last few years another attempt has been made to improve the parachute vent, by the development of the so-called 'SuperChute' in the United Kingdom by Lindstrand Balloons Limited (designed by Per Lindstrand and Simon Forse - patent particulars not known). As in the case of a conventional parachute vent, the SuperChute comprises a circular panel which seals against the balloon aperture. It may also have shroud lines from its perimeter joined centrally below the circular panel such that it can be operated like a conventional parachute vent. However, it also comprises a control rope attached to the axial center of the circular panel of the SuperChute (or to a plurality of ropes which extend radially from the center of the circular panel to the outer perimeter thereof). The SuperChute is also characterised by the rerouting of the parachute valve centering lines back up to the crown of the balloon envelope where they are held in place by an armed release mechanism or locking device which must be "fired" before actuating the rapid deflation mode. Before activation the SuperChute behaves as a typical pulley-assisted parachute valve either for in-flight venting or for final deflation in moderate wind speeds.

The SuperChute is operated by two lines, one is the arming line and the other is the final deflation line. Until the arming line is pulled, the SuperChute cannot be activated. Once armed the system is ready to activate, but it still allows the pilot to operate it similar to a conventional parachute valve. When the pilot wishes to rapidly descend or to deflate the balloon, he pulls downwardly on the central control rope which causes the parachute valve canopy to gather radially inwardly and downwardly into the balloon center, in effect forming a plume or to 'roman candle' the parachute. The overall effect is to rapidly open the balloon aperture to vent the hot air in the envelope to the atmosphere, causing the balloon to descend and to rapidly deflate. The SuperChute requires much less physical pressure or exertion to operate than does a conventional parachute vent, but it has a disadvantage in that it is not possible to reverse or to reset the SuperChute valve during flight once it has been activated, since resetting is normally carried out from outside the balloon envelope after landing procedures or before embarking on a new flight.

It is an object of this invention to provide improved venting means for the generation and control of thermal aircraft such as inflatable balloons, and especially hot air balloons.

It is another object of this invention to provide improved venting means for thermal aircraft which go at least some way towards overcoming or at least minimising the prior art problems or limitations outlined above.

It is a further object of this invention to provide improved venting means for thermal aircraft which is universally adaptable for use with any type of thermal aircraft which requires venting of an internal chamber or envelope to the atmosphere.

It is yet another object of this invention to provide improved venting means for thermal aircraft which is relatively simple and inexpensive to manufacture, and which is simple in operation.

It is yet a further object of this invention to provide thermal aircraft which comprise venting means of the type disclosed herein.

Other and further objects of the present invention will become apparent to those skilled in the art upon a study of the following description, appended claims and accompanying drawings.

SUMMARY OF THE INVENTION

According to one aspect of the present invention there is provided a thermal aircraft, such as a hot air balloon having an outer envelope for containing a quantity of hot air and supporting a load-carrying basket, the envelope having an aperture formed therein at or near its upper end to permit outflow of air from the interior of the envelope, said aperture being adapted to be closed by removable venting means under pressure of air inside the envelope, and a closure assembly for the venting means permitting controlled opening and closing thereof; wherein the venting means comprises an operculum of a flexible material and of parachute form adapted to removably cover and close the aperture, and wherein the closure assembly includes first control means to extend the operculum laterally or radially to its maximum surface area at which point it removably covers and seals said aperture, and second control means for contracting the operculum radially inwardly from or adjacent its outer peripheral edge towards its center to unseal and to open the aperture to permit outflow of air from the interior of the envelope. The present invention also provides such venting means per se, suitable for incorporating in or retrofitting to a thermal aircraft, such as a hot air balloon.

In a preferred form of the invention, the first control means include a first position at which point the operculum removably covers and seals the aperture, and a second position where the outer perimeter of the operculum may be pulled downwardly away from the perimeter edge of the aperture to variably open same.

In another preferred form of the invention, the second control means for contracting the operculum includes a control segment operatively connected to the center of the operculum for reefing the operculum radially inwardly and axially away from the aperture to unseal and to open the same. Ideally, the second control means comprises a plurality of control lines one end of each of which is attached to the outer periphery of the upper surface of the operculum at symmetrically arcuately spaced locations thereon, and extending radially inwardly therefrom over the upper surface of the operculum via control line guide means fixedly disposed within the aperture, wherein the opposite end of each control line is attached to the upper surface of the operculum at the approximate axial center thereof, and wherein a control segment of the second control means is opposedly affixed to the underside of the operculum at the approximate axial center thereof and extends downwardly therefrom to a free gripping end of the control means accessible to an individual riding in the load-carrying basket supported by the envelope.

According to another embodiment of the invention, the venting means comprises an operculum of a flexible material and of parachute form fixedly disposed within the balloon aperture by attachment to the crown right centralised in the aperture by means of the spider, and includes control means for contracting the operculum radially inwardly from or adjacent its outer peripheral edge towards its center, gathered about the crown ring.

DETAILED DESCRIPTION OF THE PREFERRED EMBODIMENTS

Figure 1:
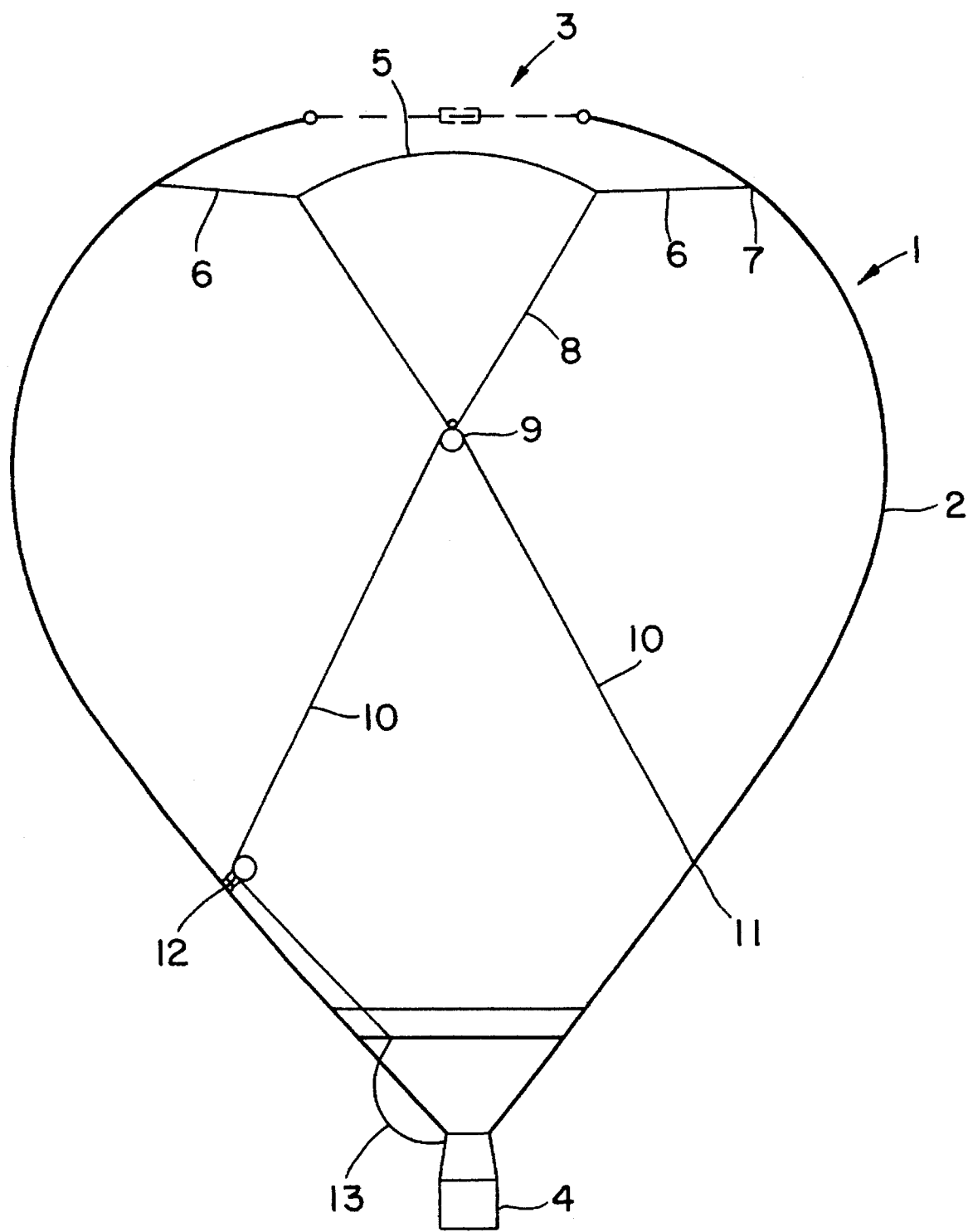
FIG. 1 is a schematic cross-sectional view of a typical hot air balloon including a standard parachute vent of known type, showing the vent in the open or deflating positions.

By way of background, FIG. 1 relates to the prior art parachute vent; FIGS. 2–8 relate to the preferred embodiments.

Referring to FIG. 1, there is shown a hot air balloon 1 comprising a hot-air-inflatable envelope or aerostat 2 embodying a plurality of gored sections, and having an opening or aperture 3 at the upper end and a basket or gondola 4 at the lower end where the balloon operator or pilot is riding. The aperture 3 is closeable by means of a venting valve comprising an operculum or valve member 5 of parachute form located adjacent the aperture by means of centralising lines 6 at spaced locations about the outer periphery of the parachute vent, each extending between the outer perimeter of the valve member 5 to a point of attachment on the inner surface of the envelope 2 at its upper end. The aperture 3 provides open communication between the interior or the balloon and the outside atmosphere except for a central crown ring and a plurality of spaced apart radially extending tapes—referred to as a spider—provided in the aperture (not shown, but represented by a broken line at the top end of the envelope). The spider serves to retain the valve member in place in the balloon aperture, and also serves to contribute to the integral strength and stability of the balloon envelope.

A plurality of shroud lines 8 depend downwardly from the outer perimeter of the valve member 5, joined together at a point 9 centrally below the valve member and fitted with a pulley at that point. A parachute activation cord 10 passes through the pulley at the point 9, being tethered at one end to the inner wall or a rib of the envelope towards the lower end thereof, as indicated at 11, with the other end of the activation cord 10 extending downwardly via a pulley 12 to the operator or balloon pilot in the basket 4. The lower end 13 of the activation cord can be attached to a suitable load frame at a point convenient for use by the pilot.

In operation, if the pilot wishes to descend or to simply vent the balloon the pilot pulls downwardly on the activation cord (13, 10, in FIG. 1). For venting of the balloon, a light pull on the cord is transferred to the shroud lines 8 whereby the outer perimeter of the valve member 5 is pulled away from the aperture 3 to allow venting of hot air from the balloon to the ambient atmosphere through the aperture 3. The upwardly directed force of the hot air within the balloon envelope maintains the central part of the valve member 5 hard up against the crown ring and the tapes of the spider in the aperture 3. When the pilot releases or eases the downward pull on the activation cord, the downward pulling force on the shroud lines 8 is also eased, and the outer perimeter of the valve member 5 is forced upwards by the internal pressure within the balloon such that the parachute seats against the edges of and seals the aperture 3 of the balloon.

By pulling the edge of the valve member 5 at one side thereof away from the edge of the aperture 3, the balloon may be caused to quicken its descent. When the pilot wants the balloon to deflate for a landing, this is achieved by fully opening the parachute valve for rapid deflation of the envelope 2, as shown in FIG. 1. This is achieved by means of a hard pull on the activation cord (13, 10 in FIG. 1) to unseat the valve member 5 completely from the aperture 3.

A detailed description of three of the preferred embodiment of the present invention follows with reference to FIGS. 2–8 of the accompanying drawings, but it should be appreciated that modifications and variations may be made to each embodiment without departing from the scope or the spirit of the invention.

Figure 2:
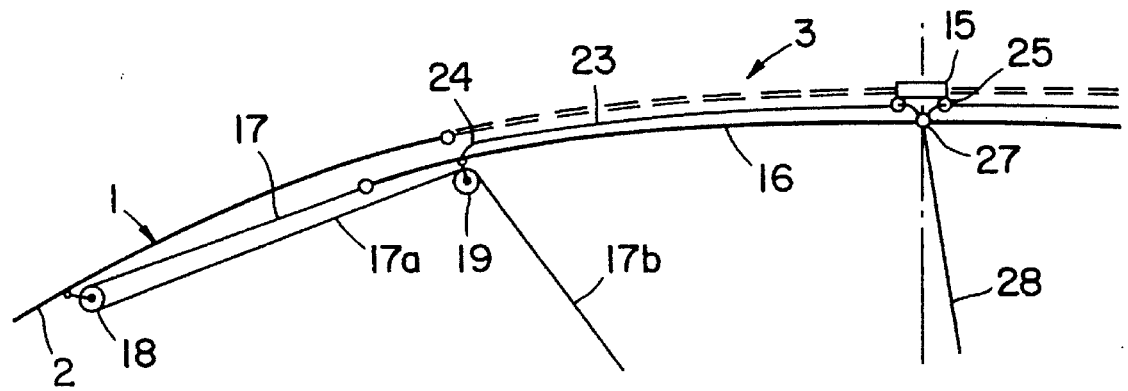
FIG. 2 is a cross-sectional view of an upper portion of a hot air balloon incorporating a venting arrangement according to one embodiment of the present invention, with the vent in the closed position.
Figure 3:
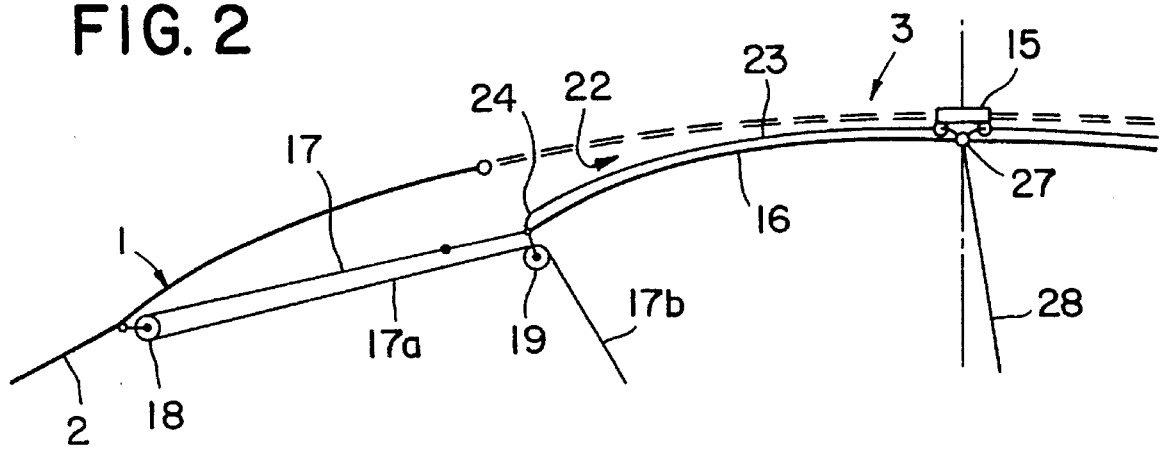
FIG. 3 is a similar view of the vent of FIG. 2 in the venting position.
Figure 4:
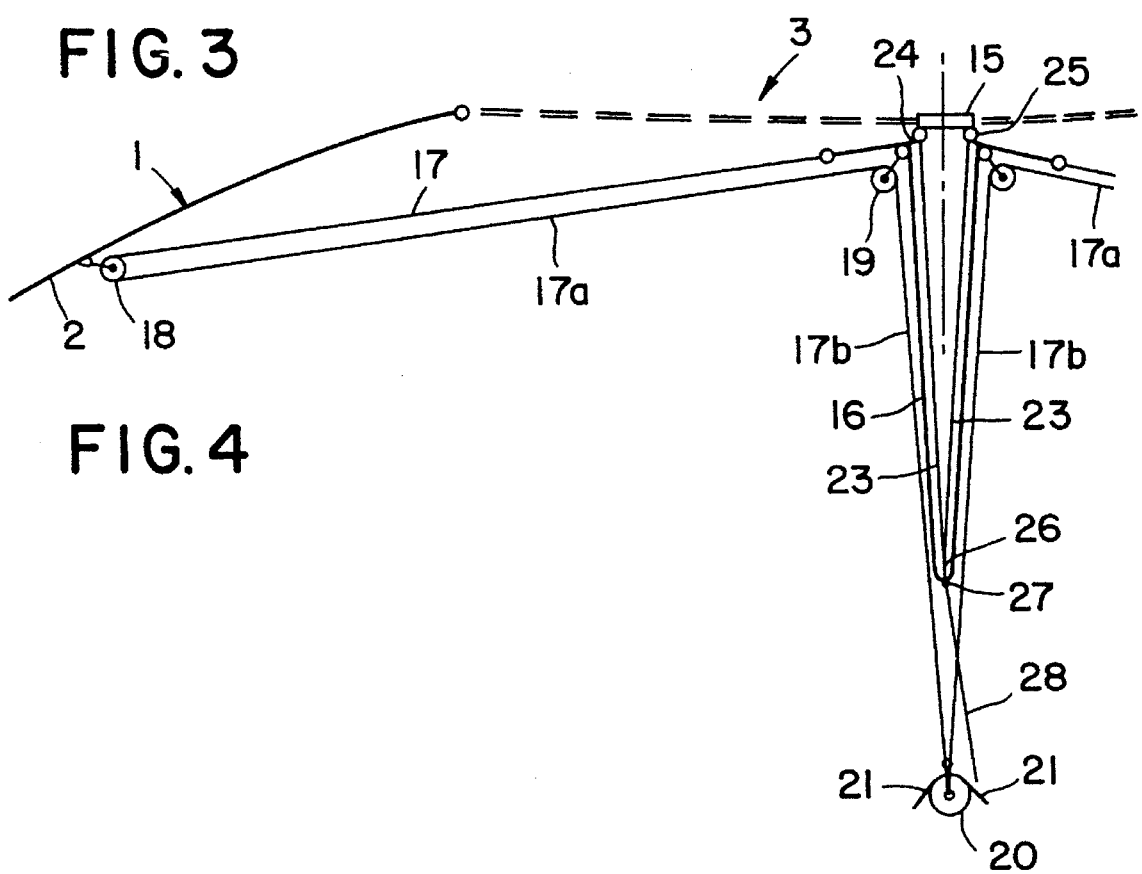
FIG. 4 is a similar view of the vent of FIGS. 2 and 3 in the open or deflating position.

Referring to FIGS. 2–4, there is shown a cross-sectional view of an upper portion of a hot air balloon incorporating a venting arrangement consistent with a first preferred embodiment of the present invention. FIG. 2 shows the venting arrangement in the closed position. In FIG. 3 the vent is partially open, whereas in FIG. 4 the vent is shown fully open. As previously, the hot air balloon 1 comprises a hot air inflatable envelope or aerostat 2 having an opening or aperture 3 at the upper end of the envelope. A plurality of tapes are affixed at spaced locations about the periphery of the aperture 3, and extending radially inwardly to join a central crown ring 15, are shown in phantom outline in FIGS. 2–4. These serve to contribute to the integral strength and stability of the balloon envelope, and to retain the operculum valve member 16 (described below) in place. The structure within the aperture 3 is referred to as a spider.

The aperture 3 is closeable by means of a venting valve comprising an operculum or venting valve member 16. The valve member forms both a deflation panel and maneuvering port for the balloon, and is designed to be opened and/or closed rapidly so as to assist in control of the balloon.

The venting valve includes first control means to extend the operculum 16 laterally or radially to its maximum surface area to close the aperture 3, and second control means to contract or gather the operculum to an area of minimum diameter to open the aperture to the outside ambient atmosphere.

The first control means, to extend the operculum 16 to its maximum surface area, or to its maximum diameter, comprises a plurality of control lines 17 attached to the outer perimeter of the valve member 16 at arcuately spaced locations and extending radially outwardly from the outer perimeter of the valve member to a pulley 18 attached to the inner surface of the envelope 2 adjacent to but spaced from the aperture 3. The control line passes over the pulley 18 and then extends back, as at 17a, to another pulley 19 attached to the underside of the valve member 16 at a position adjacent to the outer perimeter thereof. A plurality of such control lines and pulleys (e.g. from 12 to 24, depending on the size of the balloon envelope and the number of segments or gores of which it is comprised) are spaced arcuately or radially about the valve member 16. Each said control line 17a passes over its respective pulley 19 and then extends downwardly and inwardly, as at 17b to a central pulley or clew 20 (FIG. 4) situated below the valve member 16 at a point on its vertical axis line. A separate control line 21 passes over the pulley, being tethered at one end to the lower end of the balloon envelope or to the basket of the balloon (not illustrated but similar to the activation cord 10 in FIG. 1), with the other end of the control line 21 passing over the pulley 20 and extending down to the balloon pilot.

By pulling on control line 21, the pilot can extend the operculum or valve member 16 to its full diameter, or to its full surface area. By pulling even harder on the control line, the valve member 16 is pulled downwardly about its periphery from the aperture, as shown at 22 in FIG. 3, to provide venting of the hot air from within the balloon envelope to the outside ambient atmosphere in a manner similar to the operation of a conventional parachute valve as illustrated in FIG. 1, referred to above. Use of the venting valve in this way is ideal for maneuvering of the balloon. By releasing the pull pressure on the control line 2 1, the valve member 16 is forced upwards under the influence of the air pressure within the envelope, to seal the balloon aperture.

The second control means, to contract or gather the operculum or valve member 16 to an area of minimum diameter within or away from the aperture 3, comprises a plurality of control lines 23 affixed at arcuately spaced intervals 24 about the perimeter of the valve member 16, and extending radially inwardly on the outer (upper) surface of the valve member 16 to the center thereof via a plurality of guide rings 25 spaced about the overlying crown ring 15, which is centralised in the balloon aperture by means of a spider, and passing downwardly through said guide rings 25 for attachment to a central point 26 on the outer surface (i.e. the top side) of the valve member 16. At the corresponding point 27 on the inner surface of the valve member a single control line 28 is provided for choking or reefing the valve member 16 radially inwardly towards the center of the aperture and then at least partially down into the center of the balloon envelope, as illustrated in FIG. 4.

When the pilot wants to rapidly vent or to empty hot air from the balloon envelope 2, as in the final landing approach operation, he simply pulls down on the control line 28, which causes the operculum or valve member 16 to gather radially inwardly for rapid venting.

In this embodiment, the operculum vent panel 16 is pulled down into the balloon, as illustrated in FIG. 4, causing the vent panel to form a vertical plume in the center of the vent aperture 3 and extending down into the interior of the balloon. The vent aperture 3 is almost completely uncovered.

In a variation of this embodiment for smaller sized balloons, the control lines 23 are absent, and the valve member 16 is opened for deflation simply by reefing on the control line 28, whereby the valve member is pulled down into the interior of the balloon. To reseat the valve member 16, the balloon pilot pulls down on control line 21 to extend the valve member to its full diameter, relying on the pressure of hot air in the balloon envelope to force the valve member up against the spider in the aperture. However, this variation does not operate as efficiently as the embodiment with control lines 23 present since reseating of the valve member can take a longer time. This variation is not recommended for larger capacity balloons.

In use, to facilitate identification, the control ropes 21 and 28 are of different colours. For example, the venting and valve resetting line 21 can be white, whereas the reefing or deflation control line 28 can be red in colour. For added security, or to avoid inadvertent actuation, the reefing or deflation control line may incorporate a locking device (not illustrated) which must be released or removed before actuation of the control line for deflation of the balloon.

Figure 5:
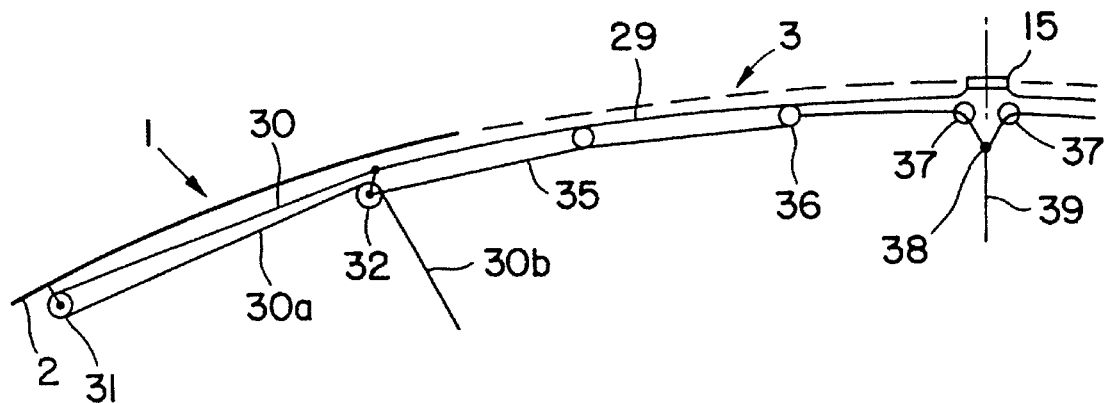
FIG. 5 is a cross-sectional view of an upper portion of a hot air balloon incorporating a venting arrangement according to another embodiment of the present invention, with the vent in the closed position.
Figure 6:
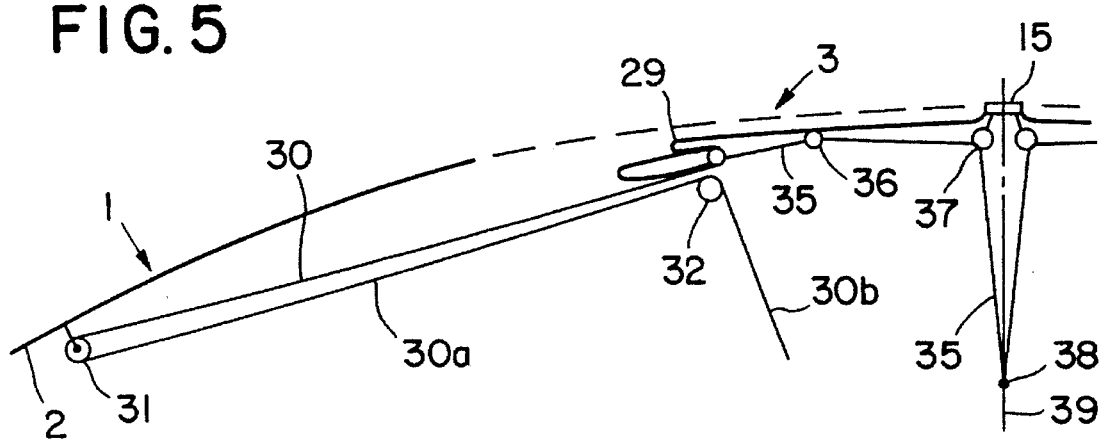
FIG. 6 is a similar view of the vent of FIG. 5 in the partially open venting or deflating position.
Figure 7:
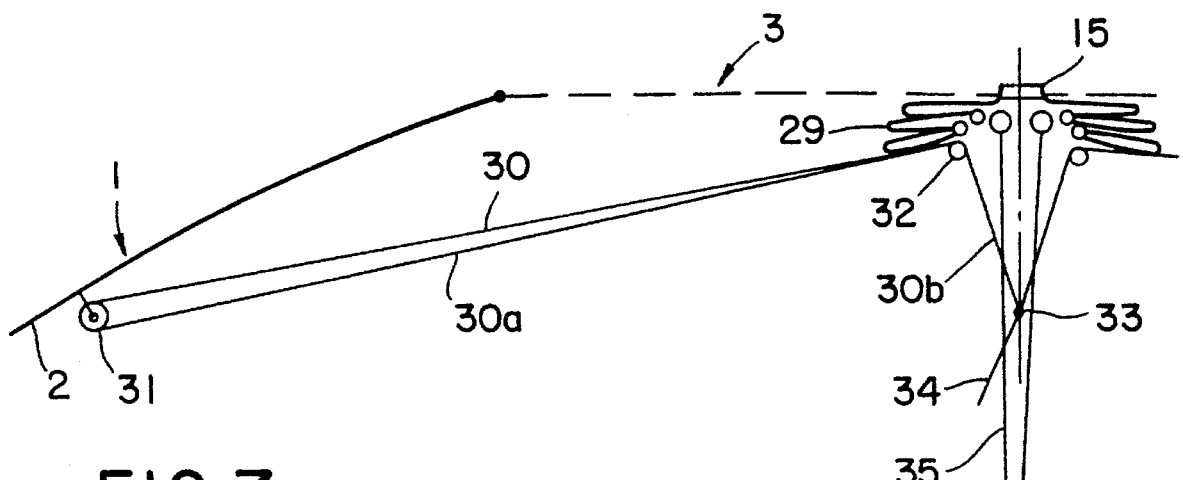
FIG. 7 is a similar view of the vent of FIGS. 5 and 6 in the fully open deflating position.

Referring to FIGS. 5–7, there is shown a cross-sectional view of an upper portion of a hot air balloon incorporating a venting arrangement consistent with a second preferred embodiment of the present invention. FIG. 5 shows the venting arrangement in the closed position. In FIG. 6 the vent is partially open, whereas in FIG. 7 the vent is shown fully open. As previously, the hot air balloon 1 comprises a hot air inflatable envelope or aerostat 2 having an opening or aperture 3 at the upper end of the envelope. A plurality of tapes are affixed at spaced locations about the periphery of the aperture 3, and extending radially inwardly to join a central crown ring 15, are shown in phantom outline in FIGS. 5–7. The structure within the aperture 3 is referred to as a spider.

The aperture 3 is closeable by means of a venting valve comprising an operculum or venting valve member 29. The valve member forms both a deflation panel and a maneuvering port for the balloon, and is designed to be opened and/or closed rapidly so as to assist in control of the balloon. In this embodiment of the invention the operculum or valve member is attached to the crown ring 15.

The venting valve includes first control means to extend the operculum 29 laterally or radially to its maximum surface area to close the aperture 3, and second control means to contract or gather the operculum to an area of minimum diameter to open the aperture to the outside ambient atmosphere.

The first control means, to extend the operculum 29 to its maximum surface area, or to its maximum diameter, comprises a plurality of control lines 30 attached to the outer perimeter of the valve member 29 at arcuately spaced locations and extending radially outwardly from the outer perimeter of the valve member to a pulley 31 attached to the inner surface of the envelope 2 adjacent to but spaced from the aperture 3. The control line passes over the pulley 31 and then extends back, as at 30a, to another pulley 32 attached to the underside of the valve member 29 at a position adjacent to the outer perimeter thereof. A plurality of such control lines and pulleys (e.g. from 12 to 24, depending on the size of the balloon envelope and the number of segments or gores of which it is comprised) are spaced arcuately or radially about the valve member 29. Each said control line 30a passes over its respective pulley 32 and then extends downwardly and inwardly, as at 30b to a central pulley or clew 33 (FIG. 7) situated below the valve member 29 at a point on its vertical axis line. A separate control line 34 passes over the pulley or is attached to the clew, with a free end of the control line 34 extending down to the balloon pilot.

By pulling on control line 34, the pilot can extend the operculum or valve member 29 to its full diameter, or to its full surface area. By pulling even harder on the control line, the valve member 29 is pulled downwardly about its periphery from the aperture to provide venting of the hot air from within the balloon envelope to the outside ambient atmosphere in a manner similar to the operation of a conventional parachute valve as illustrated in FIG. 1, referred to above. Use of the venting valve in this way is ideal for maneuvering of the balloon. By releasing the pull pressure on the control line 34, the valve member 29 is forced upwards under the influence of the air pressure within the envelope, to seal the balloon aperture.

The second control means, to contract or gather the operculum or valve member 29 inwardly towards and about the crown ring 15, to an area of minimum diameter within the aperture 3, comprises a plurality of control lines 35 affixed at arcuately spaced intervals about the perimeter of the valve member 29 or, as shown in FIGS. 5–7, to each pulley 32. Each control line 35 then extends radially inwards therefrom on the inner (lower) surface of the valve member 29 towards the center thereof via a plurality of guide rings 36 attached to the underside of the valve member 29, and via guide rings 37 spaced about the overlying crown ring 15. Each control line 35 then passes downwardly through the guide rings 37 for attachment at a central point 38 to a clew or pulley. From this point (38) a single control line 39 is provided for choking the valve member 29 radially inwardly towards the center of the aperture, as illustrated in FIG. 7.

When the pilot wants to rapidly vent or to empty hot air from the balloon envelope 2, as in the final landing approach operation, he simply pulls down on the control line 39, which causes the operculum or valve member 29 to gather radially inwardly to its minimum diameter, opening the balloon aperture 3 for rapid venting or emptying of hot air from the balloon envelope.

As in the previous embodiment, the control ropes 34 and 39 can be of different colours to facilitate identification thereof by the pilot.

Figure 8:
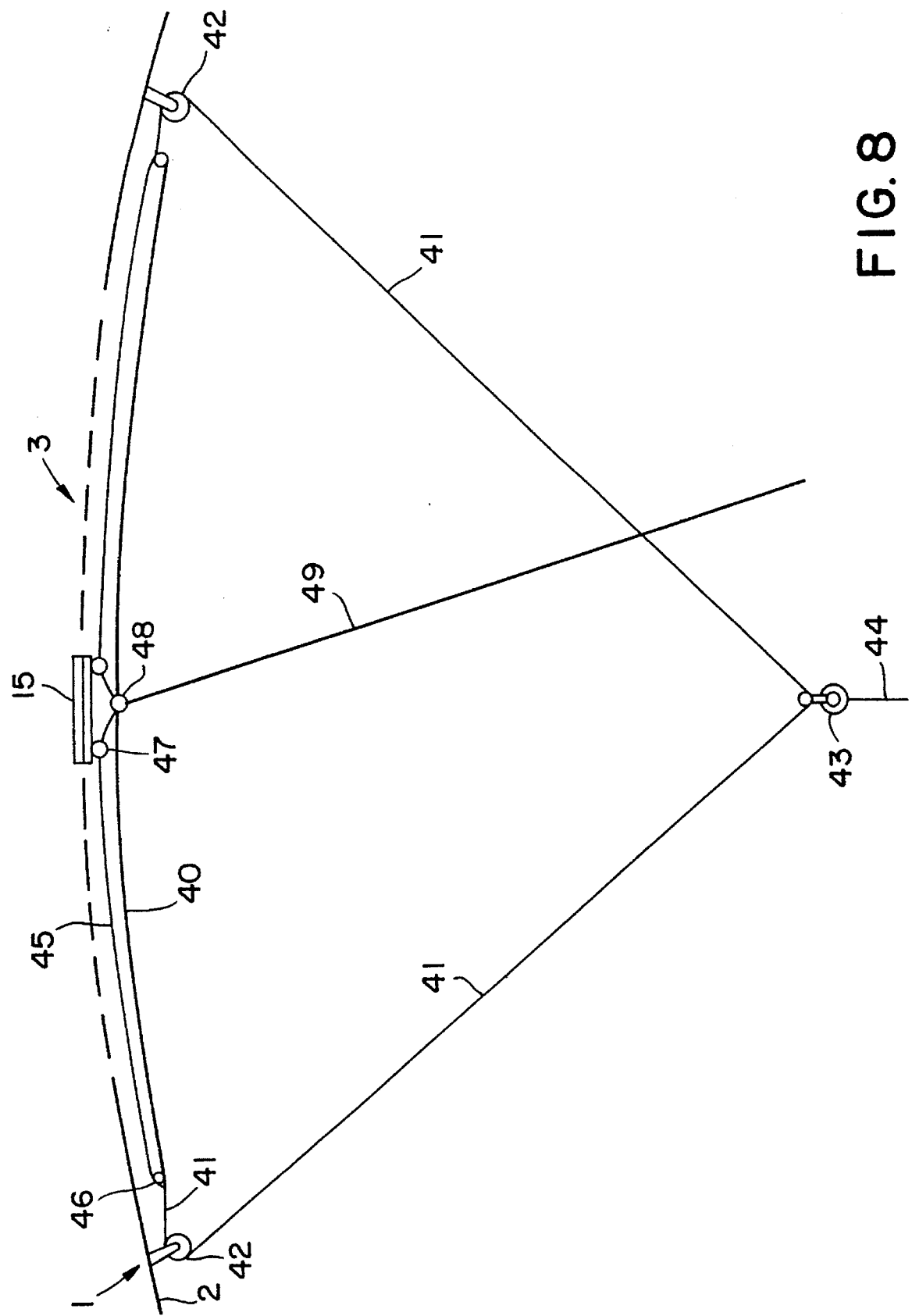
FIG. 8 is a cross-sectional view of the upper portion of a hot air balloon incorporating a venting arrangement according to a further embodiment of the present invention, with the vent in the closed position.

A third embodiment of the invention is illustrated in FIG. 8, which shows a cross-sectional view of the upper end of a hot air balloon. In this view the venting arrangement is in the closed position. As previously, the hot air balloon 1 comprises a hot air inflatable envelope or aerostat 2 having an opening or aperture 3 at the upper end of the envelope. A plurality of tapes are affixed at spaced location about the periphery of the aperture 3, and extending radially inwardly to join a central crown ring 15, are shown in phantom outline in FIG. 8 (i.e. the spider).

The aperture 3 is closeable by means of an operculum or valve member 40, and acts essentially as a venting or deflation port for the balloon, and is designed to be opened and/or closed rapidly so as to assist in the control of the balloon.

The venting valve included first control means to extend the operculum 40 laterally or radially to its maximum surface area to close the aperture 3, and second control means to contract or gather the operculum to an area of minimum diameter to open the aperture to the outside ambient atmosphere.

The first control means, to extend the operculum 40 to its maximum surface area, or to its maximum diameter, comprises a plurality of control lines 41 attached to the outer perimeter of the valve member 40 at arcuately spaced locations and extending radially outwardly from the outer perimeter of the valve member to a pulley 42 attached to the inner surface of the envelope 2 adjacent to but spaced from the aperture 3. The control line 41 passes over the pulley 42 and then extends downwardly and inwardly to a central pulley or clew 43 situated below the valve member 40 at point on its vertical axis line. A separate control line 44 passes over the pulley or is attached to the clew with a free end of the control line 44 extending down to the balloon pilot.

By pulling on control line 44, the pilot can extend the operculum or valve member 40 to its full diameter, or it its full surface area to close the balloon aperture.

The second control means, to contract or gather the operculum or valve member 40 to an area of minimum diameter within or away from the aperture 3, comprises a plurality of control lines 45 affixed at arcuately spaced intervals 46 about the perimeter of the valve member 40, and extending radially inwardly on the outer (upper) surface of the valve member 40 to the center thereof via a plurality of guide rings 47 spaced about the overlying crown ring 15, and passing downwardly through said guide rings 47 for attachment to a central point 48 on the outer surface (i.e. the top side) of the valve member 40. At the corresponding point on the inner surface of the valve member a single control line 49 is provided for choking or reefing the valve member 40 radially inwardly towards the center of the aperture and then at least partially down into the center of the balloon envelope.

When the pilot wants to vent air from the balloon envelope 2, say for gradual descent of the balloon, he pulls down on the control line 49 to retract the vent panel or operculum 40 sufficiently to create an opening between the rim of balloon aperture and the retracted outer periphery of the vent panel.

When the pilot wants to rapidly vent or to empty hot air from the balloon envelope 2, as in the final landing approach operation, he simply pulls down on the control line 49, which causes the operculum or valve member 40 to gather radially inwardly for rapid venting.

In this embodiment, the operculum vent panel 40 is pulled down into the balloon, causing the vent panel to form a vertical plume in the center of the vent aperture 3 and extending down into the interior of the balloon. The vent aperture 3 is almost completely uncovered. As previously described above, for added security, or to avoid inadvertent actuation, the control line 49 may incorporate a locking device (not illustrated) which must be released or removed before actuation of the control line for deflation of the balloon.

In a variation of this embodiment for small sized balloons, the control lines 45 are absent and the valve member is opened for deflation simply by reefing on the control line 49 whereby the valve member 40 is pulled down into the interior of the balloon. To reseat the valve member 40, the balloon pilot pulls down on control line 44 to extend the valve member to its full diameter, relying on the pressure of hot air in the balloon envelope to force the valve member up against the spider in the aperture.

With the valving arrangement of the present invention, the balloon envelope empties of hot air in about 60% of the time it takes for a parachute vent of the same size. The other main advantage is that after the vent has been actuated for deflation, should the pilot change his mind (e.g. because of adverse landing conditions), the vent can be reset halfway through the landing, enabling the balloon to continue in flight. Another advantage is that when the balloon is being inflated before a flight, the vent of the present invention is easier to reset than a standard parachute vent. Preferably, the vent panel or valve member 16 is fitted to the balloon aperture and held temporarily in the required orientation or position during inflation by means of a plurality of 'Velcro' tabs or similar self-fastening material.

Thus the present invention provides for infinite control of the venting valve or operculum, repeated opening and closing thereof being possible during flight operation for maneuvering or deflation of the balloon. This provides the pilot with a great deal of control over the flight of the balloon, especially during final landing procedures and especially during such procedures in gusty or windy conditions, contributing significantly to control and safety.

Although exemplary embodiments of the present invention have been shown and described, it will be appreciated by those having ordinary skill in the art that a number of changes, modifications or alterations to the invention herein may be made, none of which depart from the spirit of the present invention. All such changes, modifications and alterations should therefor be seen as being within the scope of the present invention.

It should be appreciated that the present invention provides a substantial advance in the generation and control of thermal aircraft, such as hot air balloons, providing all of the herein described advantages without incurring any relative disadvantage.

I claim:

1. A thermal aircraft having an outer envelope for containing a quantity of hot air and supporting a load-carrying basket, said envelope having an aperture formed therein at or near its upper end to permit outflow of air from the interior of said envelope, said aperture being adapted to be closed by removable venting means under pressure of air inside the envelope, and a closure assembly for the venting means permitting controlled opening and closing thereof, wherein said venting means comprises an operculum of a flexible material and of parachute form adapted to removably cover and close said aperture, and wherein said closure assembly includes first control means to extend said operculum laterally or radially to its maximum surface area at which point it removably covers and seals said aperture, and second control means for contracting said operculum radially inwardly from or adjacent its outer peripheral edge towards its center to unseal and to open said aperture to permit outflow of air from the interior of the envelope.

2. A hot air balloon having an outer envelope for containing a quantity of hot air and supporting a load-carrying basket, said envelope having an aperture formed therein at or near its upper end to permit outflow of air from the interior of said envelope, said aperture being adapted to be closed by removable venting means under pressure of air inside the envelope, and a closure assembly for the venting means permitting controlled opening and closing thereof; wherein said venting means comprises an operculum of a flexible material and of parachute form adapted to removably cover and close said aperture, and wherein said closure assembly includes first control means to extend said operculum laterally or radially to its maximum surface area at which point it removably covers and seals said aperture, and second control means for contracting said operculum radially inwardly from or adjacent its outer peripheral edge towards its center to unseal and to open said aperture to permit outflow of air from the interior of the envelope.

3. A hot air balloon according to claim 2, wherein said first control means include a first position at which point the operculum removably covers and seals the aperture, and a second position where the outer perimeter of the operculum may be pulled downwardly away from the perimeter edge of the aperture to variably open same.

4. A hot air balloon according to claim 3, wherein the first control means to extend the operculum to its maximum surface area to cover the aperture and/or to variably open the aperture comprises a plurality of control lines each attached to the outer periphery of the operculum at symmetrically arcuately spaced locations thereon and extending radially outwardly therefrom to corresponding first pulley means attached to the inner surface of the envelope, passing about said first pulley means and then extending radially inwardly therefrom to corresponding second pulley means attached to the underside of the operculum at symmetrically arcuately spaced locations above the outer periphery thereof, passing about said second pulley means and then extending downwardly and inwardly therefrom to a third pulley means or clew disposed below and generally coaxially with said operculum, with a control segment of said first control means passing about said third pulley means or clew and extending downwardly therefrom to a free gripping end of said first control means accessible to an individual riding in the load-carrying basket supported by the envelope.

5. A hot air balloon according to claim 2, wherein the second control means for contracting the operculum includes a control segment operatively connected to the center of the operculum for reefing said operculum radially inwardly and axially away from the aperture to unseal and to open the same.

6. A hot air balloon according to claim 5, wherein the second control means for contracting the operculum comprises a plurality of control lines one end of each of which is attached to the outer periphery of the upper surface of the operculum at symmetrically arcuately spaced locations thereon, and extending radially inwardly therefrom over the upper surface of the operculum via control line guide means fixedly disposed within the aperture adjacent the axial center thereof, wherein the opposite end of each said control line is attached to the upper surface of the operculum at the approximate axial center thereof, and wherein a control segment of said second control means is opposedly affixed to the underside of the operculum at the approximate axial center thereof and extends downwardly therefrom to a free gripping end of said control means accessible to an individual tiding in the load-carrying basket supported by the envelope.

7. A hot air balloon according to claim 6, wherein the second control means includes locking means which must first be released or removed prior to use of said second control means.

8. A hot air balloon having an outer envelope for containing a quantity of hot air and supporting a load-carrying basket, said envelope having an aperture formed therein at or near its upper end to permit outflow of air from the interior of said envelope, said aperture being adapted to be closed by removable venting means under pressure of air inside the envelope, and a closure assembly for the venting means permitting controlled opening and closure thereof, wherein said venting means comprises an operculum of a flexible material and of parachute form adapted to removably cover and close said aperture, and wherein said closure assembly includes first control means to extend said operculum laterally or radially to its maximum surface area at which point it removably covers and seals said aperture, and second control means operatively connected to the center of the operculum for reefing said operculum radially inwardly and axially away from the aperture to unseal and to open said aperture to permit outflow of air from the interior of the envelope, wherein said first control means comprises a plurality of control lines each attached to the outer periphery of the operculum at symmetrically arcuately spaced locations thereon and extending radially outwardly therefrom to corresponding first pulley means attached to the inner surface of the envelope, passing about said pulley means and then extending downwardly and inwardly therefrom to a second pulley means or clew disposed below and generally coaxially with said operculum, with a control segment of said first control means passing about said second pulley means or clew and extending downwardly therefrom to a free gripping end of said first control means accessible to an individual riding in the load-carrying basket supported by the envelope.

9. A hot air balloon according to claim 8, wherein said second control means to unseal and to open the aperture comprises a plurality of control lines one end of each of which is attached to the outer periphery of the upper surface of the operculum at symmetrically arcuately spaced locations thereon, and extending radially inwardly therefrom over the upper surface of the operculum via control line guide means fixedly disposed within the aperture, wherein the opposite end of each said control line is attached to the upper surface of the operculum at the approximate axial center thereof, and wherein a control segment of said second control means is opposedly affixed to the underside of the operculum at the approximate axial center thereof and extends downwardly therefrom to a free gripping end of said control means accessible to an individual riding in the load-carrying basket supported by the envelope.

10. A hot air balloon having an outer envelope for containing a quantity of hot air and supporting a load-carrying basket, said envelope having an aperture formed therein at or near its upper end to permit outflow of air from the interior of the envelope, said aperture being adapted to be closed by venting means under pressure of air inside the envelope, and a closure assembly for the venting means permitting controlled opening and closure thereof, wherein said venting means comprises an operculum of a flexible material and of parachute form fixedly disposed within the aperture at the approximate axial center thereof and adapted to releasably cover and close said aperture, and wherein said closure assembly includes first control means to extend said operculum laterally or radially to its maximum surface area at which point it removably covers and seals said aperture, and second control means for contracting said operculum radially inwardly from or adjacent its outer peripheral edge towards its center to unseal and to open said aperture to permit outflow of air from the interior of the envelope.

11. A hot air balloon according to claim 10, wherein the first control means includes a first position at which point the operculum releasably covers and seals the aperture, and a second position where the outer perimeter of the operculum may be pulled downwardly away from the perimeter edge of the aperture to variably open same.

12. A hot air balloon according to claim 11, wherein the first control means to extend the operculum to its maximum surface area to cover the aperture and/or to variably open the aperture comprises a plurality of control lines each attached to the outer periphery of the operculum at symmetrically arcuately spaced locations thereon and extending radially outwardly therefrom to corresponding first pulley means attached to the inner surface of the envelope, passing about said first pulley means and then extending radially inwardly therefrom to corresponding second pulley means attached to the underside of the operculum at symmetrically arcuately spaced locations about the outer periphery thereof, passing about said second pulley means and then extending downwardly and inwardly therefrom to a third pulley means or clew disposed below and generally coaxially with said operculum, with a control segment of said first control means passing about said third pulley means or clew and extending downwardly therefrom to a free gripping end of said first control means accessible to an individual riding in the load-carrying basket supported by the envelope.

13. A hot air balloon according to claim 10, wherein the second control means for contracting the operculum comprises a plurality of control lines one end of which is attached adjacent the outer periphery of the lower surface of the operculum at symmetrically arcuately spaced locations thereon, and extending radially inwardly therefrom adjacent said lower surface via control line guide means fixedly disposed within the aperture adjacent the axial center thereof, then extending downwardly and inwardly therefrom to a pulley means or clew disposed below and generally coaxially with said operculum, with a control segment of said second control means passing about said pulley means or clew and extending downwardly therefrom to a free gripping end of said second control means accessible to an individual riding in the load carrying basket supported by the envelope.

14. Venting means for a thermal aircraft, said thermal aircraft having an outer envelope for containing a quantity of hot air and an aperture in said envelope at or near its upper end for venting of hot air from the envelope, said aperture being adapted to be temporarily closed or sealed by said venting means; said venting means comprising an operculum of a flexible material and of parachute form adapted to removably cover and close said aperture; first control means to extend said operculum laterally or radially to its maximum surface area at which point it removably covers and seals said aperture, and second control means for contracting said operculum radially inwardly from or adjacent its outer peripheral edge towards it center to unseal and to open the same.

15. Venting means for a thermal aircraft according to claim 14, wherein said first control means are adapted to extend said operculum laterally or radially to its maximum surface area to a first position at which point it removably covers and seals said aperture, and at a second position where the outer perimeter of the operculum may be pulled away from the perimeter edge of the aperture to variably open same, and wherein said second control means are operatively connected to the center of the operculum for reefing said operculum radially inwardly and axially away from the aperture to unseal and to open the same.

16. Venting means according to claim 15, wherein the first control means to extend the operculum to its maximum surface area and/or to variably open the aperture comprises a plurality of control lines each attached to the outer periphery of the operculum at symmetrically arcuately spaced locations thereon and extending radially outwardly therefrom to corresponding first pulley means attached to the inner surface of the envelope, passing about said first pulley means and then extending radially inwardly therefrom to corresponding second pulley means attached to the underside of the operculum at symmetrically arcuately spaced locations about the outer periphery thereof, passing about said second pulley means and then extending downwardly and inwardly therefrom to a third pulley means or clew disposed generally coaxially with said operculum, with a control segment of said first control means passing about said third pulley means or dew and extending downwardly therefrom to a free gripping end of said first control means accessible to an individual riding in a load-carrying basket supported by said envelope at the lower end thereof.

17. Venting means according to claim 15, wherein the second control means to contract or gather the operculum and to open the aperture comprises a plurality of control lines one end of each of which is attached to the outer periphery of the upper surface of the operculum at symmetrically arcuately spaced locations thereon, and extending radially inwardly therefrom over the upper surface of the operculum via control line guide means fixedly disposed within the aperture adjacent the axial center thereof, wherein the opposite end of each said control line is attached to the upper surface of the operculum at the approximate axial center thereof, and wherein a control segment of said second control means is oppposedly affixed to the underside of the operculum at the approximate axial center thereof and extends downwardly therefrom to a free gripping end of said second control means accessible to an individual riding in a load carrying basket supported by said envelope at the lower end thereof.

18. Venting means for a thermal aircraft, said thermal aircraft having an outer envelope for containing a quantity of hot air and an aperture in said envelope at or near its upper end for venting of hot air from the envelope, said aperture being adapted to be temporarily closed or sealed by said venting means, said venting means comprising an operculum of a flexible material and of parachute form adapted to removably cover and close said aperture, first control means to extend said operculum laterally or radially to its maximum surface area at which point it removably covers and seals said aperture, and second control means operatively connected to the center of the operculum for reefing said operculum radially inwardly and axially away from the aperture to unseal and to open said aperture to permit outflow of air from the interior of the envelope, wherein said first control means comprises a plurality of control lines each attached to the outer periphery of the operculum at symmetrically arcuately spaced locations thereon and extending radially outwardly therefrom to corresponding first pulley means attached to the inner surface of the envelope, passing about said pulley means and then extending downwardly and inwardly therefrom to a second pulley means or clew disposed below and generally coaxially with said operculum, with a control segment of said first control means passing about said second pulley means or clew and extending downwardly therefrom to a free gripping end of said first control means accessible to an individual riding in a load-carrying basket supported by the envelope.

19. Venting means according to claim 18, wherein said second control means to unseal and to open the aperture comprises a plurality of control lines one end of each of which is attached to the outer periphery of the upper surface of the operculum at symmetrically arcuately spaced locations thereon, and extending radially inwardly therefrom over the upper surface of the operculum via control line guide means fixedly disposed within the aperture, wherein the opposite end of each said control line is attached to the upper surface of the operculum at the approximate axial center thereof, and wherein a control segment of said second control means is oppposedly affixed to the underside of the operculum at the approximate axial center thereof and extends downwardly therefrom to a free gripping end of said control means accessible to an individual riding in the load-carrying basket supported by the envelope.

20. Venting means for a thermal aircraft, said thermal aircraft having an outer envelope for containing a quantity of hot air and supporting a load-carrying basket, said envelope having an aperture formed therein at or near its upper end to permit outflow of air from the interior of the envelope, said aperture being adapted to be closed by venting means under pressure of air inside the envelope, said venting means comprising an operculum of a flexible material and of parachute form fixedly disposed within the aperture at the approximate axial center thereof and adapted to releasably cover and close said aperture, first control means to extend said operculum laterally or radially to its maximum surface area at which point it removably covers and seals said aperture, and second control means for contracting said operculum radially inwardly from or adjacent its outer peripheral edge towards its center to unseal and to open said aperture to permit outflow of air from the interior of the envelope.

21. Venting means according to claim 20, wherein the first control means includes a first position at which point the operculum releasably covers and seals the aperture, and a second position where the outer perimeter of the operculum may be pulled downwardly away from the perimeter edge of the aperture to variably open same.

22. Venting means according to claim 21, wherein the first control means to extend the operculum to its maximum surface area to cover the aperture and/or to variably open the aperture comprises a plurality of control lines each attached to the outer periphery of the operculum at symmetrically arcuately spaced locations thereon and extending radially outwardly therefrom to corresponding first pulley means attached to the inner surface of the envelope, passing about said first pulley means and then extending radially inwardly therefrom to corresponding second pulley means attached to the inner surface of the envelope, passing about said first pulley means and then extending radially inwardly therefrom to corresponding second pulley means attached to the underside of the operculum at symmetrically arcuately spaced locations about the outer periphery thereof, passing about said second pulley means and then extending downwardly and inwardly therefrom to a third pulley means or clew disposed below and generally coaxially with said operculum, with a control segment of said first control means passing about said third pulley means or clew and extending downwardly therefrom to a free gripping end of said first control means accessible to an individual riding in the load-carrying basket supported by the envelope.

23. Venting means according to claim 20, wherein the second control means for contracting the operculum comprises a plurality of control lines one end of which is attached adjacent the outer periphery of the lower surface of the operculum at symmetrically arcuately spaced locations thereon, and extending radially inwardly therefrom adjacent said lower surface via control line guide means fixedly disposed within the aperture adjacent the axial center thereof, then extending downwardly and inwardly therefrom to a pulley means or clew disposed below and generally coaxially with said operculum, with a control segment of said second control means passing about said pulley means or clew and extending downwardly therefrom to a free gripping end of said second control means accessible to an individual riding in the load carrying basket supported by the envelope.

* * * * *